United States Patent
Akari et al.

(10) Patent No.: US 12,530,960 B2
(45) Date of Patent: Jan. 20, 2026

(54) INFORMATION PROVIDING METHOD, VEHICLE SYSTEM AND MANAGEMENT DEVICE

(71) Applicant: Nissan Motor Co., Ltd., Yokohama (JP)

(72) Inventors: Narihiro Akari, Kanagawa (JP); Masahide Nakamura, Kanagawa (JP); Yoshitaka Takagi, Kanagawa (JP); Eijo Iwasaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 268 days.

(21) Appl. No.: 17/907,100

(22) PCT Filed: Mar. 18, 2021

(86) PCT No.: PCT/IB2021/000166
§ 371 (c)(1),
(2) Date: Sep. 23, 2022

(87) PCT Pub. No.: WO2021/191682
PCT Pub. Date: Sep. 30, 2021

(65) Prior Publication Data
US 2024/0046778 A1 Feb. 8, 2024

(30) Foreign Application Priority Data
Mar. 26, 2020 (JP) .................. 2020-056307

(51) Int. Cl.
*G08G 1/01* (2006.01)
*G08G 1/04* (2006.01)
(Continued)

(52) U.S. Cl.
CPC ............. *G08G 1/0112* (2013.01); *G08G 1/04* (2013.01); *G08G 1/096708* (2013.01); *G08G 1/123* (2013.01)

(58) Field of Classification Search
CPC .. G08G 1/0112; G08G 1/04; G08G 1/096708; G08G 1/123
(Continued)

(56) References Cited

U.S. PATENT DOCUMENTS 10,239,539 B2   3/2019   Aoki et al.
10,276,048 B2 * 4/2019   Beaurepaire ........... G08G 1/143
(Continued)

FOREIGN PATENT DOCUMENTS

EP   2528330 A1 * 11/2012 ......... B62D 15/0275
EP   3 584 099 A1   12/2019
(Continued)

OTHER PUBLICATIONS

Combs et al., "Automated Vehicles and Pedestrian Safety: Exploring the Promise and Limits of Pedestrian Detection", American Journal of Preventive Medicine, vol. 56, Issue 1, Jan. 2019, pp. 1-7.
(Continued)

*Primary Examiner* — Adam D Tissot
(74) *Attorney, Agent, or Firm* — GLOBAL IP COUNSELORS, LLP

(57) ABSTRACT

A vehicle system includes an information providing device, an information collection device, a communication device and a controller. The information providing device provides information to a user of a vehicle about an object that is located in a periphery of the vehicle. The information collection device collects information data related to the object located in the periphery of the vehicle. The communication device communicates with the information collection device and the information providing device. The
(Continued)

controller controls the communication device. The controller determines a possibility that an object will enter a monitoring region around the periphery of the vehicle in a case where the vehicle stops at a stop location, and upon determining there is a possibility that the object will enter the monitoring region, information data related to the object is transmitted to an information providing device.

14 Claims, 10 Drawing Sheets

(51) Int. Cl.
    *G08G 1/0967*     (2006.01)
    *G08G 1/123*     (2006.01)
(58) Field of Classification Search
    USPC ............................................. 701/117
    See application file for complete search history.

(56) References Cited

U.S. PATENT DOCUMENTS

| | | | | |
|---|---|---|---|---|
| 11,008,783 | B2* | 5/2021 | Sakakura | ................ B60R 11/04 |
| 2013/0311038 | A1 | 11/2013 | Kim et al. | |
| 2019/0146519 | A1* | 5/2019 | Miura | ................... B60W 30/09 |
| | | | | 701/28 |

FOREIGN PATENT DOCUMENTS

| | | |
|---|---|---|
| JP | 2018-134887 A | 8/2018 |
| JP | 2018141802 A | 9/2018 |
| JP | 2018-206186 A | 12/2018 |
| JP | 2019-178960 A | 10/2019 |
| JP | 2019-192069 A | 10/2019 |
| KR | 20190044727 A | 5/2019 |

OTHER PUBLICATIONS

Alahi et al., "Social LSTM: Human Trajectory Prediction in Crowded Spaces", IEEE Conference on Computer Vision and Pattern Recognition, Jun. 2016, 11 pages.

Swanson et al., "Crash Avoidance Needs and Countermeasure Profiles for Safety Applications Based on Light-Vehicle-to-Pedestrian Communications", U.S. Department of Transportation, National Highway Traffic Safety Administration, Report No. Dot Hs 812 312, Aug. 1, 2016, 155 pages.

First Examination Report received for IN Application No. 202247060444, mailed on Nov. 6, 2025, 7 pages.

\* cited by examiner

INFORMATION PROVIDING METHOD, VEHICLE SYSTEM AND MANAGEMENT DEVICE

CROSS-REFERENCE TO RELATED APPLICATIONS

This application is a U.S. national stage application of International Application No. PCT/IB2021/000166, filed on Mar. 18, 2021. This application claims priority to Japanese Application No. 2020-056307, filed on Mar. 26, 2020.

BACKGROUND

Technical Field

The present invention relates to an information providing method, a vehicle system and a management device.

Background Information

For example, Japanese Laid-Open Patent Application No. 2018-134887 (Patent Document 1) discloses a vehicle periphery monitoring device that uses an image-capturing unit mounted on a vehicle to support safety as the vehicle is being deboarded. Specifically, the vehicle periphery monitoring device predicts, based on images of the areas behind and on the rearward sides of the vehicle taken by the image-capturing unit, whether a target object will enter a door opening/closing region after the vehicle has stopped.

SUMMARY

However, according to the technology disclosed in Patent Document 1, the detection range of the target object is limited since the images are captured by the image-capturing unit after the vehicle has come to a stop.

In light of the problems described above, an object of the present invention is to provide an information providing method, a vehicle system, and a management device that can increase the accuracy of information to be provided to a user by detecting an object over a wide area.

An information providing method according to one aspect of the present invention comprises detecting objects located in the vehicle periphery, acquiring movement information data, which is information related to the movement of an object, determining whether it is possible that the object will enter a monitoring region around the vehicle periphery in the case that the vehicle comes to a stop at a stop location, and transmitting information data related to the object to an information providing device when it is determined that it is possible that the object will enter the monitoring region.

With the present invention, since it is possible to detect objects located in the vehicle periphery before the vehicle stops at a stop location, objects can be detected over a wide area. It is thus possible to increase the accuracy of the information to be provided to the user.

BRIEF DESCRIPTION OF THE DRAWINGS

Referring now to the attached drawings which form a part of this original disclosure.

DETAILED DESCRIPTION OF EMBODIMENTS

Figure 1:
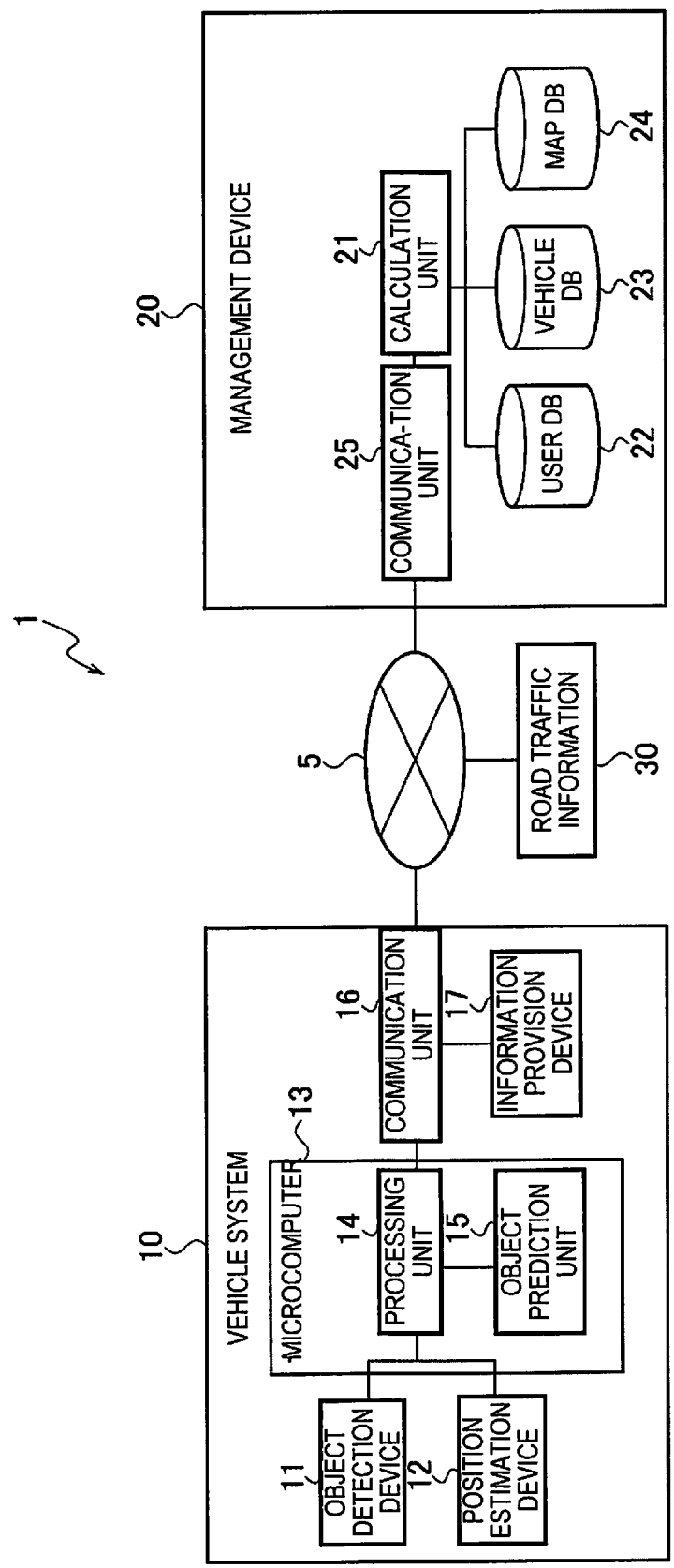
FIG. 1 is a block diagram showing the configuration of a safety support system according to the present embodiment.

An embodiment of the present invention will be described below with reference to the figures. In the descriptions of the figures, identical parts have been assigned the same reference numerals, and their descriptions have been omitted.

The configuration of a safety support system 1 according to the present embodiment will be described with reference to FIG. 1. The safety support system 1 provides information to a user who uses a vehicle in order to support safety. A user who uses a vehicle is typically a user who boards the vehicle, such as a user who is scheduled to deboard a vehicle at a stop location where the vehicle stops, or a user who is scheduled to board a vehicle at a stop location.

The safety support system 1 is primarily composed of a vehicle system 10 and a management device 20. The vehicle system 10 and the management device 20 are configured to be capable of communicating with each other via a network 5. Further, a road traffic information system 30 is connected to the network 5. The vehicle system 10 and the management device 20 can communicate with the road traffic information system 30 via the network 5. The network 5 is, for example, the Internet. The network 5 may utilize mobile communication functions, such as 4G/LTE or 5G.

The vehicle system 10 detects objects in vehicle periphery and carries out a process for providing necessary information to the user based on the detection result of an object. The vehicle system 10 has an object detection device 11, a position estimation device 12, a microcomputer 13, a communication unit 16, and an information providing device 17.

The vehicle system 10 is applied to a vehicle (service vehicle) that provides transportation service in accordance with a dispatch request from a user. The vehicle may be an engine vehicle driven only by an engine, a hybrid vehicle driven by an engine and an electric motor, or an electric vehicle driven only by an electric motor.

The vehicle is an autonomous driving vehicle that travels by means of an autonomous driving function with a driver on board. However, the vehicle may also be driven manually by a driver or by means of an autonomous driving function without a driver on board.

Autonomous driving refers to a state in which at least one of actuator, such as a brake, accelerator, steering, is controlled without an operation from the occupant. Therefore, other actuators may be operated by means of an operation from the occupant. Further, autonomous driving may be any state in which any control, such as acceleration/deceleration control, lateral position control, etc., is being executed. Also, manual driving in the present embodiment refers to a state in which an occupant is operating the brake, the accelerator, or the steering wheel, for example.

The object detection device 11 includes a plurality of object detection sensors installed in the vehicle. The object detection device 11 collects information data related to objects located in the vehicle periphery using the plurality of object detection sensors (information collection device).

The plurality of object detection sensors include a laser rangefinder. A laser rangefinder senses the surroundings of the vehicle (e.g., 360 degrees) within a prescribed region and outputs sensing results data. The sensing results data are output in the format of a point cloud, for example. The plurality of object detection sensors includes a camera. The camera captures images of the surroundings of the vehicle (e.g., 360 degrees) and outputs the captured image data. A plurality of cameras are arranged so as to be able to capture images of the surroundings of the vehicle. The object detection device 11 outputs the sensing results data and the image data to the microcomputer 13 as information data related to an object (hereinafter referred to as "object information data"). The object detection device 11 may include other sensor types besides the laser rangefinder and the camera.

The position estimation device 12 uses position estimation technology such as GPS (Global Positioning System), odometry, and the like to measure the absolute position of the vehicle. The position estimation device 12 includes a GPS receiver, an inertial navigation device, sensors provided in the brake pedal and the accelerator pedal, sensors for acquiring vehicle behavior, such as wheel speed and yaw rate sensors, a laser radar, a camera, etc. The position estimation device 12 measures the position, speed, acceleration, steering angle, and orientation (direction of movement) of the vehicle.

The microcomputer 13 controls the vehicle system 10.

The microcomputer 13 is a general-purpose microcomputer with a hardware processor, such as a CPU (Central Processing Unit), memory, and an input/output unit. A computer program is installed in the microcomputer to make it function as the vehicle system 10. By executing the computer program, the microcomputer 13 functions as a plurality of information processing circuits included in the vehicle system 10. In the present embodiment, an example is shown in which the plurality of information processing circuits included in the vehicle system 10 is realized in software, but the information processing circuits can, of course, be realized in dedicated hardware for executing the information processing shown below. Further, the plurality of information processing circuits may be realized in discrete hardware.

The microcomputer 13 has a processing unit 14 and an object prediction unit 15 as the plurality of information processing circuits.

The processing unit 14 acquires object information data from the object detection device 11. The processing unit 14 detects objects located in the vehicle periphery based on the object information data and generates object movement information data, which is information related to the movement of an object. Information related to the movement of an object includes the object's position, speed, orientation (direction of movement), acceleration, steering angle, etc.

The processing unit 14 generates one piece of object information data for each object by integrating the object information data obtained from the plurality of object detection sensors provided in the object detection device 11. More specifically, from the object information data obtained from each of the object detection sensors, rational object information data with the smallest errors are computed in consideration of the error characteristics, etc., of each of the object detection sensors.

The processing unit 14 tracks the detected objects. Specifically, the processing unit 14 verifies and associates the identity of the objects between different times from the object behaviors output at different times, and tracks the objects based on the associations. In this way, the object movement information data, which includes information related to the movement of objects, are generated.

The processing unit 14 detects the types of objects, such as moving objects and stationary objects, based on the object information data and the object movement information data. Further, the processing unit 14 detects the types of moving objects, such as other vehicles, motorcycles, bicycles, and pedestrians. Similarly, the processing unit 14 detects the types of stationary objects, such as parked vehicles and buildings. The type of object constitutes part of the information related to the movement of an object.

The processing unit 14 has the function of recording information related to the movement of an object. As a result, the processing unit 14 records a history of information related to the movement of the object as the vehicle is traveling.

Further, the processing unit 14 generates vehicle information data, which include various information related to the vehicle based on the vehicle state and the calculation result of the position estimation device 12. The vehicle information data include information such as the vehicle's location, orientation (direction of movement), speed, opened/closed state of the door and door lock, sensor value of a seatbelt sensor that detects an attachment or detachment of the seatbelt, whether or not autonomous driving is in progress, and the like.

The object prediction unit 15 acquires the object movement information data and the vehicle information data from the processing unit 14. Further, the object prediction unit 15 acquires road traffic information data, described further below, from the road traffic information system 30. The object prediction unit 15 acquires map information data, described further below, from a map database (map DB) 24 of the management device 20.

Based on the road traffic information data and the map information data, the object prediction unit 15 calculates an arrival time based on the time it takes the vehicle to travel from its current position to a stop location where the vehicle will stop. The object prediction unit 15 can acquire stop location data that indicate the stop location from data acquired from the management device 20, specifically, from dispatch request data, described further below.

The object prediction unit 15 detects the presence or absence of a user scheduled to deboard or the presence or absence of a user scheduled to board. A user scheduled to deboard means a user scheduled to get off a vehicle at a stop location, and a user scheduled to board means a user scheduled to get on a vehicle at a stop location. The object prediction unit detects the presence or absence of a user scheduled to deboard and the presence or absence of a user scheduled to board based on data obtained from the management device 20, specifically, from dispatch request data, described further below.

The object prediction unit 15 predicts the behavior of an object based on the object movement information data computed by the processing unit 14. Based on the behavior prediction result, the object prediction unit 15 then determines whether or not it is possible that the object will enter a monitoring region set around the vehicle periphery in the case that the vehicle stops at a stop location. When it is determined that it is possible that the object will enter the monitoring region, the object prediction unit 15 transmits information data related to the object to the information providing device 17.

The communication unit 16 communicates with the management device 20 or the road traffic information system 30 via the network 5. The communication unit 16 stores the information obtained from the management device 20 or the road traffic information system in a memory, etc., not shown in the figure. Further, the communication unit 16 transmits vehicle information to the management device 20. For example, the communication unit 16 may be a communication device with mobile communication functions, such as 4G/LTE, or a communication device with Wi-Fi communication functions.

Further, the communication unit 16 carries out communication with the information providing device 17. The communication unit 16 transmits information to be provided to the occupants to the information providing device 17. For example, the communication unit 16 may be a device with mobile communication functions, such as 4G/LTE, or a device with Wi-Fi communication functions. Further, the communication unit 16 may carry out wired communication with the information providing device 17, such as via a wire harness.

The information providing device 17 provides information to a user who uses the vehicle. The information providing device 17 is, for example, a display device installed in the vehicle. The display device is arranged in a position that can be visually ascertained by the user. For example, if the user is riding in the back seat of the vehicle, the information providing device 17 is provided on the back side of the front seat.

Further, the information providing device 17 is not limited to its being furnished in the vehicle. The information providing device 17 may be a user terminal owned by the user, such as a mobile information terminal, such as a mobile phone, smartphone, or a communication device.

The management device 20 acquires dispatch request data, which include a dispatch request from the user terminal, and carries out various processes for providing transportation service by the vehicle in accordance with the acquired dispatch request data. The management device 20 is composed of one or a plurality of computers.

The management device 20 has a calculation unit (controller) 21, a user database (user DB) 22, a vehicle database (vehicle DB) 23, a map database (map DB) 24, and a communication unit 25.

The calculation unit 21 updates the vehicle database 23 with vehicle information data obtained from the vehicle system 10. The calculation unit 21 can ascertain the state of the vehicle based on the vehicle database 23.

Further, the calculation unit 21 carries out a prescribed process based on the dispatch request data stored in the user database 22. More specifically, the calculation unit 21 determines which vehicle is to be dispatched to the user who made the dispatch request. Further, the calculation unit 21 generates vehicle dispatch information, such as a point of departure, destination, travel route, etc. That is, based on the map information in the map database 24, the calculation unit 21 computes the travel route over which the vehicle can travel from the point of departure to the destination set in the dispatch request, i.e., from the boarding location where the user gets on to the deboarding location where the user gets off. In computing the travel route, road traffic information data may be referenced, and the route that takes the least amount of time to arrive at the destination from the point of departure may be taken into consideration.

The user database 22 manages the dispatch request data acquired from user terminal, that is, information (request information) of the vehicle dispatch request. In the user database 22, the request information is managed for each user, and each piece of request information is associated with a user ID that identifies the user.

The request information includes at least the location information of the user's point of departure. The location information of the point of departure is the current location information detected by means of a location positioning function provided in the user terminal. For example, the location positioning function consists of a GPS receiver that receives GPS satellite signals. However, the location information of the point of departure may be location information input by the user as the point of departure. In addition to the location information of the point of departure, the request information may also include information such as the location of the destination, the designation of a transit point and its location, the number of occupants, baggage information, the time at which the dispatch request was obtained, the desired boarding time, whether or not ride sharing is acceptable, etc.

When dispatch request data are acquired from the user terminal, the user database 22 adds the data to the user database 22. The user database 22 then provides the dispatch request data to the calculation unit 21.

The vehicle database 23 manages vehicle information data. In the vehicle database 23, vehicle information data are managed for each vehicle, and each piece of vehicle information data is associated with a vehicle ID that identifies the vehicle.

The vehicle information data include at least the vehicle location information. The vehicle information data also include information such as the orientation (direction of movement), speed, door lock and door open/closed status, sensor values of a seatbelt sensor that detects whether the seatbelts are fastened or unfastened, whether or not the vehicle is in autonomous driving mode, etc. Further, the service information may include dispatch-related information, such as whether the vehicle can be reserved, whether the vehicle is being picked up or dropped off, whether there are passengers, the number of passengers, the boarding or deboarding status, and whether the vehicle has arrived at the destination.

When the vehicle information data are acquired from the vehicle, the vehicle database 23 adds the necessary information based on these data to the vehicle database 23.

The map database 24 stores map information data, which include map information that indicates the structure of roads on which the vehicle can travel. The map information includes information related to road structures, such as the absolute locations of lanes, lane connection relationships and relative positional relationships of lanes, etc., as well as traffic rules, road signs, etc. The map information also includes information related to areas or locations where users can board or deboard. Further, the map information may include information regarding vehicle waiting areas, and pedestrian road information for calculating routes on which the user can walk.

The communication unit 25 communicates with the vehicle system 10 or the road traffic information system 30 via the network 5. The communication unit 25 stores the information acquired from the vehicle system 10 or the road traffic information system 30 (vehicle information, map information, and the like) in a memory, etc., not shown. The communication unit 25 also transmits dispatch information to the vehicle system 10. For example, the communication unit 25 may be a communication device with mobile communication functions, such as 4G/LTE, or a communication device with Wi-Fi communication functions.

The communication unit 25 also communicates with the user terminal. The communication unit 25 stores information (vehicle dispatch request data) acquired from the user terminal in a memory, etc., not shown.

The road traffic information system 30 manages road traffic information data that include road traffic information. Road traffic information is information that affects vehicle travel, such as traffic congestion information and travel regulation information. Traffic information is, for example, VICS (Vehicle Information and Communication System).

Figure 2:
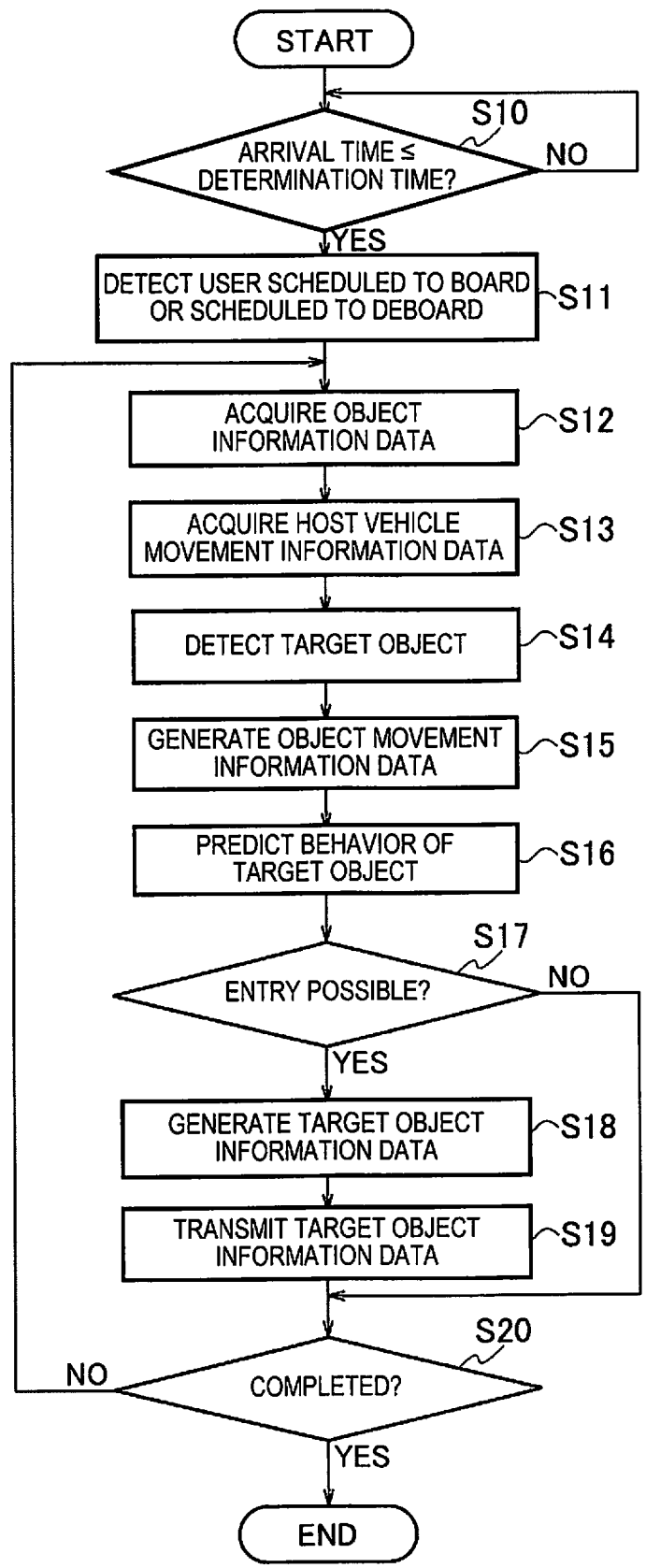
FIG. 2 is a flowchart showing the operation of a vehicle system according to the present embodiment.

Reference is made to FIGS. 2 to 9 for the description of the operation of the safety support system 1 according to this embodiment, i.e., the method for providing information to the user using the information providing device 17. The flowchart shown in FIG. 2 is executed by the microcomputer 13.

First, in Step S10, the object prediction unit 15 determines whether an arrival time T is less than or equal to a determination time. The arrival time T is the time required for a vehicle Va, which is the host vehicle, starting from its current location, to arrive at a stop location Pa along a travel route. The arrival time is calculated based on the current location of the vehicle Va, the distance to the stop location Pa on the travel route, and the like. Also taken into consideration in the calculation of the arrival time T is road traffic information, e.g., the effect of traffic congestion. The determination time, on the other hand, is the time it takes for the vehicle Va to draw near the stop location Pa and determine that it is appropriate to start the detection of objects.

For example, if the user using a vehicle Va is scheduled to deboard the vehicle Va at a stop location Pa, then the stop location Pa corresponds to the destination of the dispatch request received from the user. Further, if the user using a vehicle Va is scheduled to board the vehicle Va at a stop location Pa, then the stop location Pa corresponds to the point of departure of the dispatch request received from the user.

If the arrival time is less than or equal to the determination time, the object prediction unit 15 detects that the moving vehicle will stop at the stop location Pa. That is, the object prediction unit 15 detects that the vehicle will stop at the stop location Pa in the future (before the determination time elapses). In this case, Step S10 makes a positive determination, and the process proceeds to Step S11. If, on the other hand, the arrival time exceeds the determination time, Step S10 makes a negative determination, and the process returns to Step S10.

In Step S11, the object prediction unit 15 detects the presence or absence of a user scheduled to deboard or the presence or absence of a user scheduled to board.

In Step S14, the processing unit 14 acquires object information data from the object detection device 11.

In Step S13, the processing unit 14 acquires host vehicle movement information data, which include the movement information of the vehicle Va based on the vehicle state and the calculation result of the position estimation device 12.

The movement information of the vehicle Va includes information such as the position, speed, and orientation (direction of movement) of the vehicle Va.

In Step S14, the processing unit 14 recognizes the type of object based on the object information data and detects the moving object as a target object. Further, the processing unit 14 detects the type of target object, such as another vehicle, a motorcycle, bicycle, or a pedestrian.

In Step S15, the processing unit 14 generates object movement information data that include the movement information of the target object. The movement information of the target object includes the position, speed, and orientation (direction of movement) of the target object.

In Step S16, the object prediction unit 15 predicts the behavior of the target object based on the object movement information data and the host vehicle movement information data.

Figure 3:
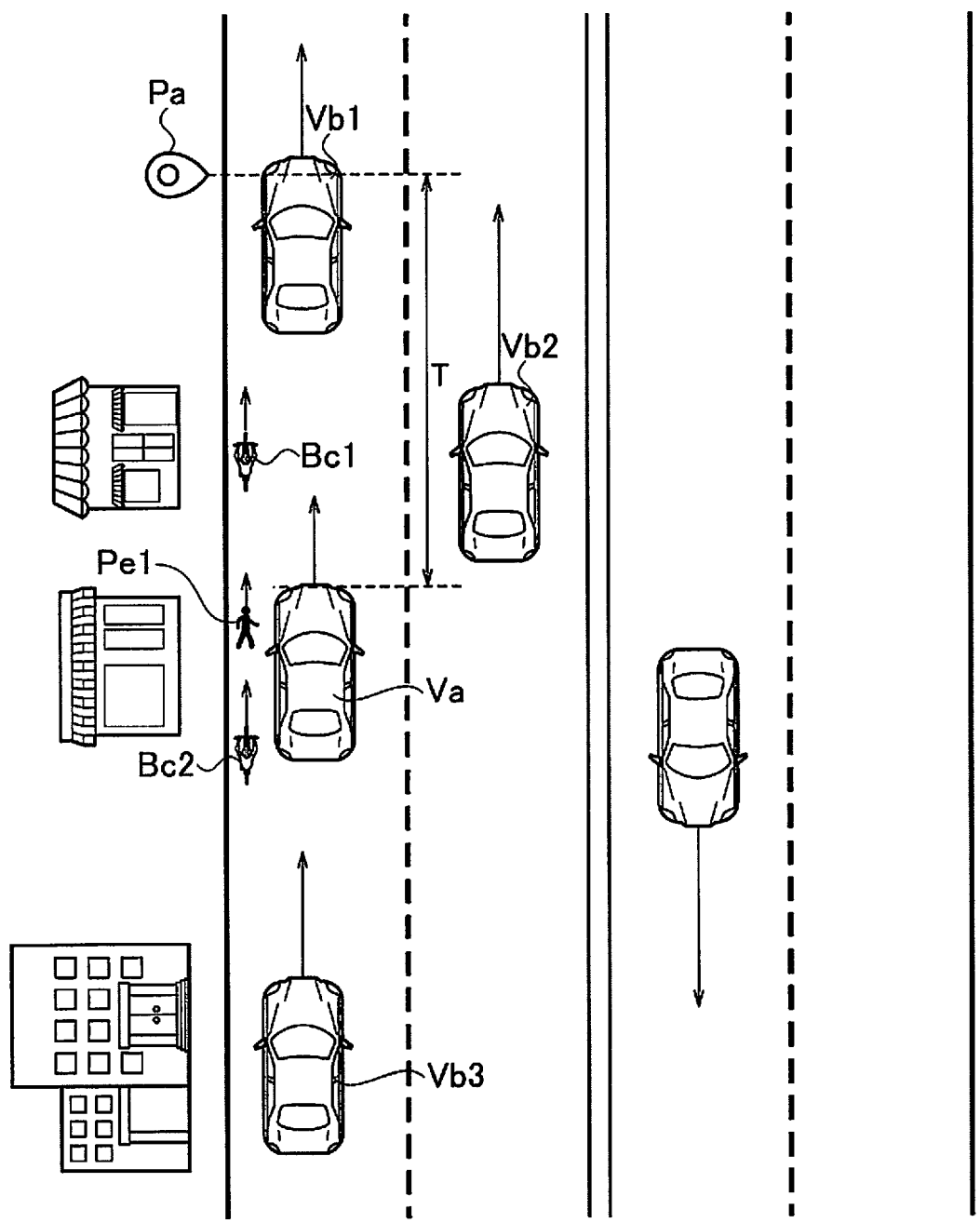
FIG. 3 is an explanatory diagram showing an example of a driving environment around the periphery of a vehicle.

In FIG. 3, the target objects are the other vehicles Vb1, Vb2, Vb3, pedestrian Pe1, and bicycles Bc1, Bc2 traveling in the vicinity of the vehicle Va.

Figure 4:
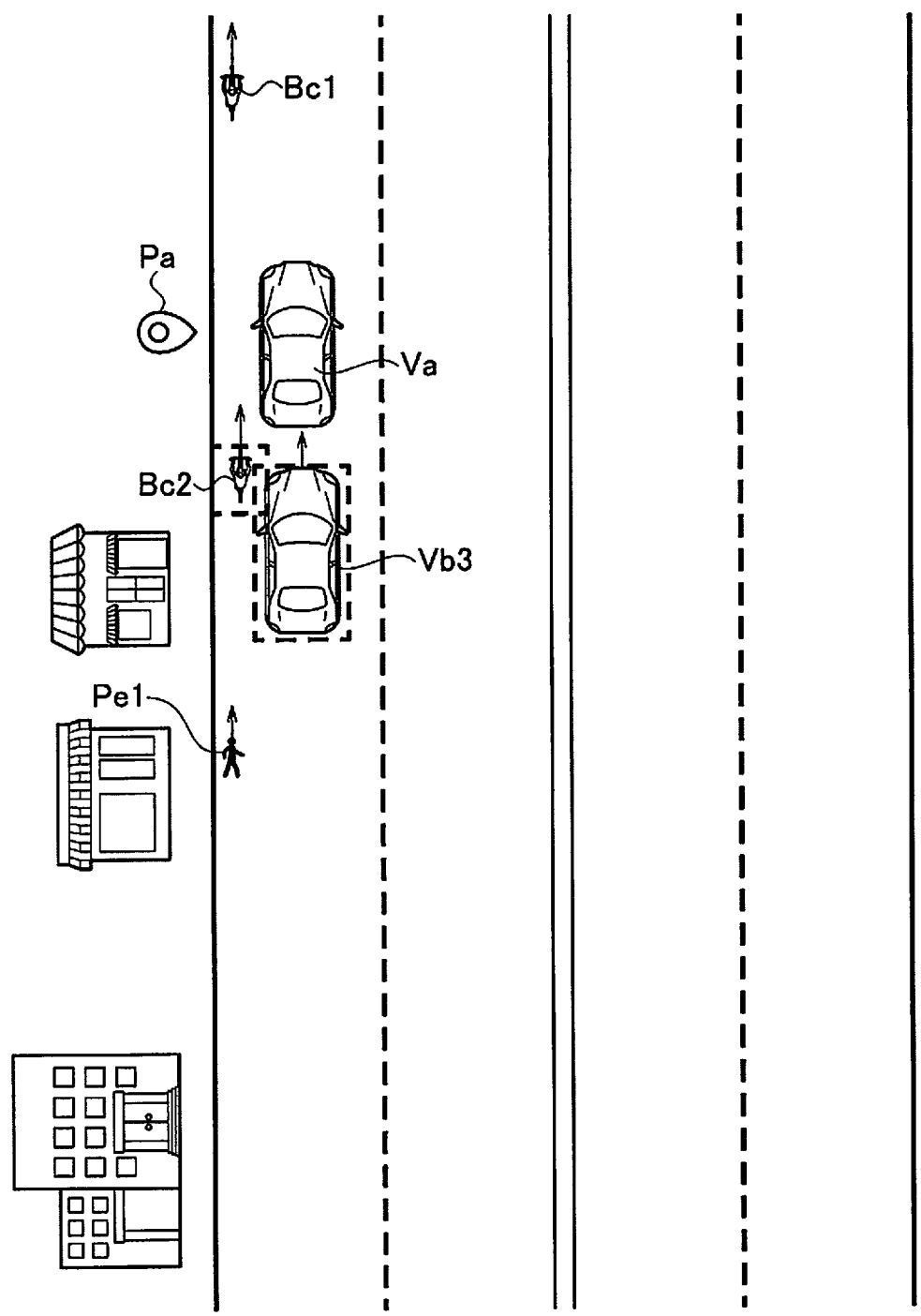
FIG. 4 is an explanatory diagram predicting the behavior of a target object in the case that the vehicle stops at a stop location

The object prediction unit 15 calculates the time required for the vehicle Va to arrive at the stop location Pa based on the host vehicle movement information data, the distance to the stop location Pa, etc. Then, the object prediction unit 15 assumes that the target objects will continue their current behavior, and predicts the position of the target objects after the required time has elapsed, that is, when the vehicle Va arrives at the stop location Pa. The object prediction unit 15 also assumes that the other vehicle Vb3 will slow down as the vehicle Va comes to a stop since it is affected by the vehicle Va. By means of such drive predictions, as shown in FIG. 4, the bicycle Bc2 and the other vehicle Vb3 are predicted to enter the vicinity of the vehicle Va as the vehicle Va comes to a stop at the stop location Pa.

Figure 5:
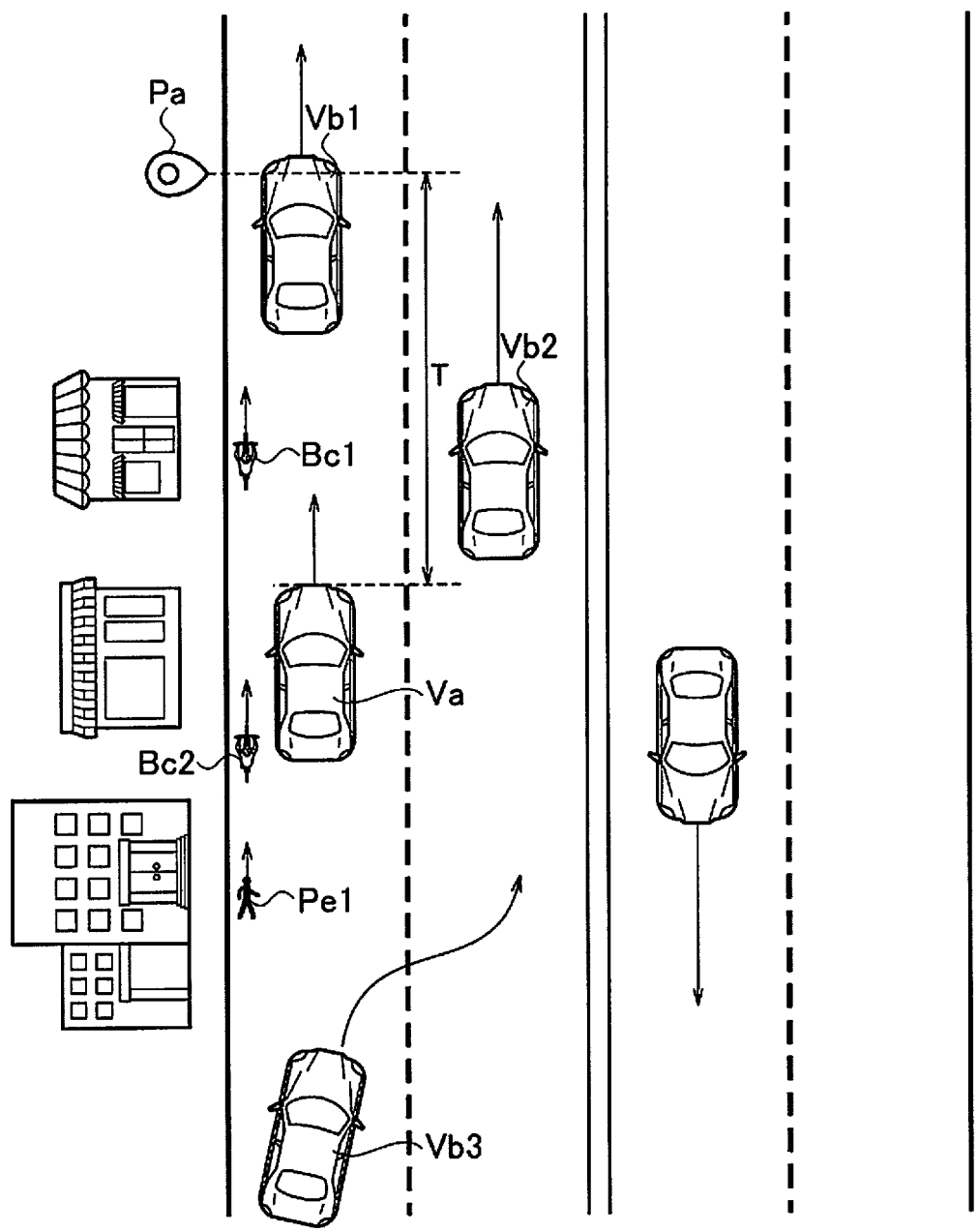
FIG. 5 is an explanatory diagram showing an example of a driving environment around the periphery of a vehicle.
Figure 6:
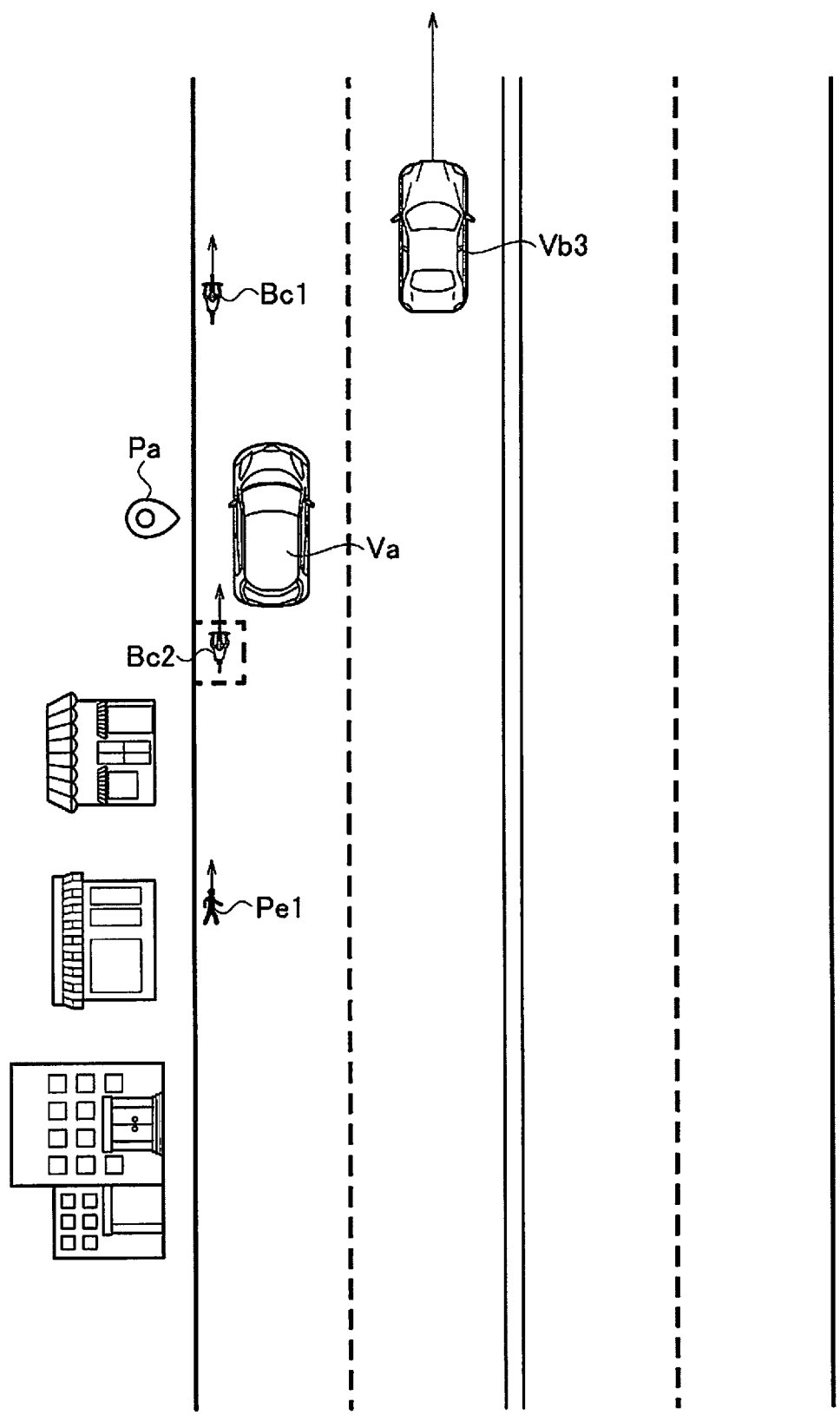
FIG. 6 is an explanatory diagram predicting the behavior of the target object in the case that the vehicle stops at the stop location.

If, on the other hand, as shown in FIG. 5, the other vehicle Vb3 is changing lanes, the object prediction unit 15 can infer the lane change from the orientation identified from the object movement information data. In this case, the object prediction unit 15 assumes that the other vehicle Vb3 will continue to travel at the same speed, since it is unaffected by the vehicle Va. As a result, as shown in FIG. 6, the behavior of the other vehicle Vb3 is predicted not to be in the vicinity of the vehicle Va when the vehicle Va has stopped at the stop location Pa.

Figure 7:
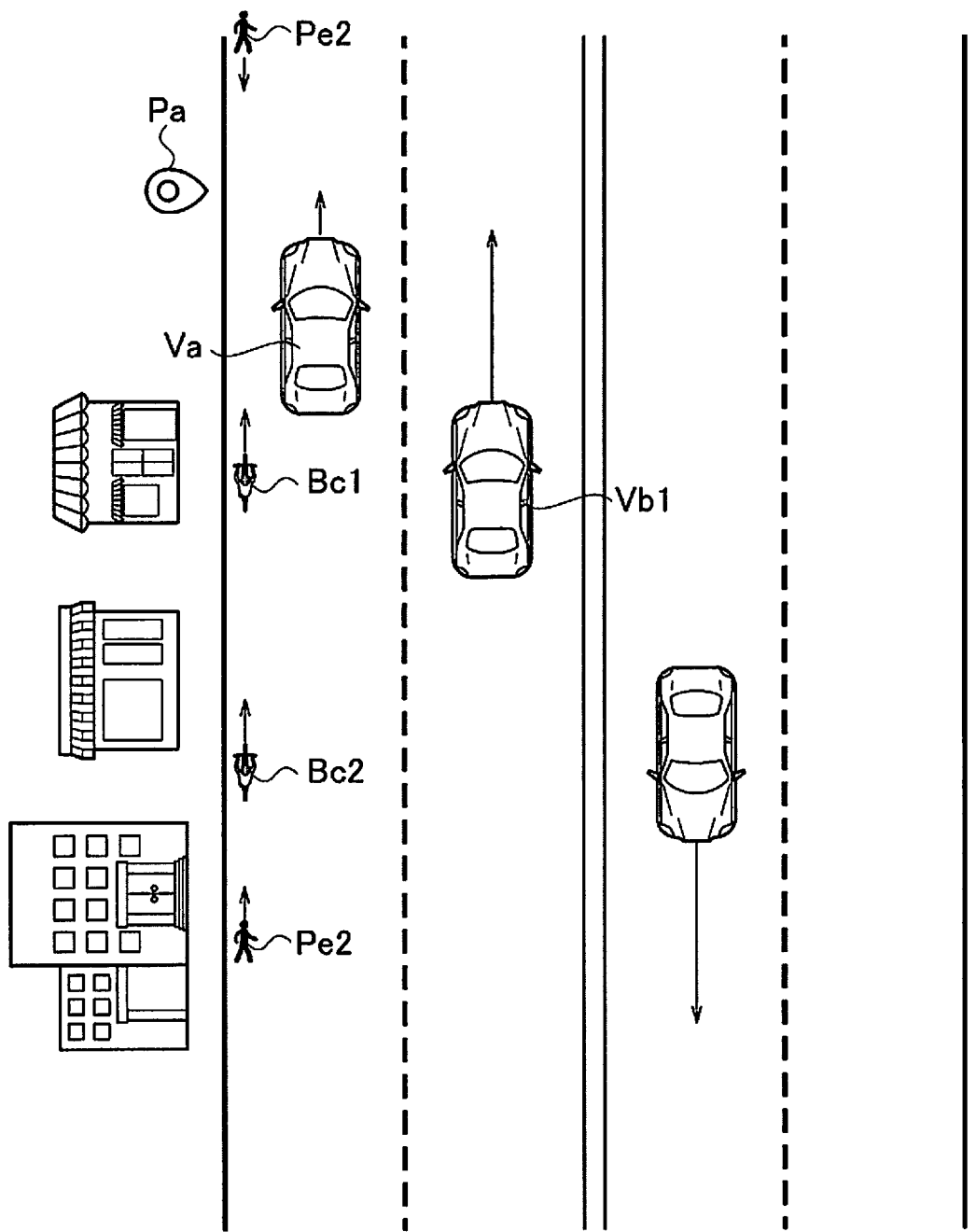
FIG. 7 is an explanatory diagram showing an example of a driving environment around the periphery of a vehicle.
Figure 8:
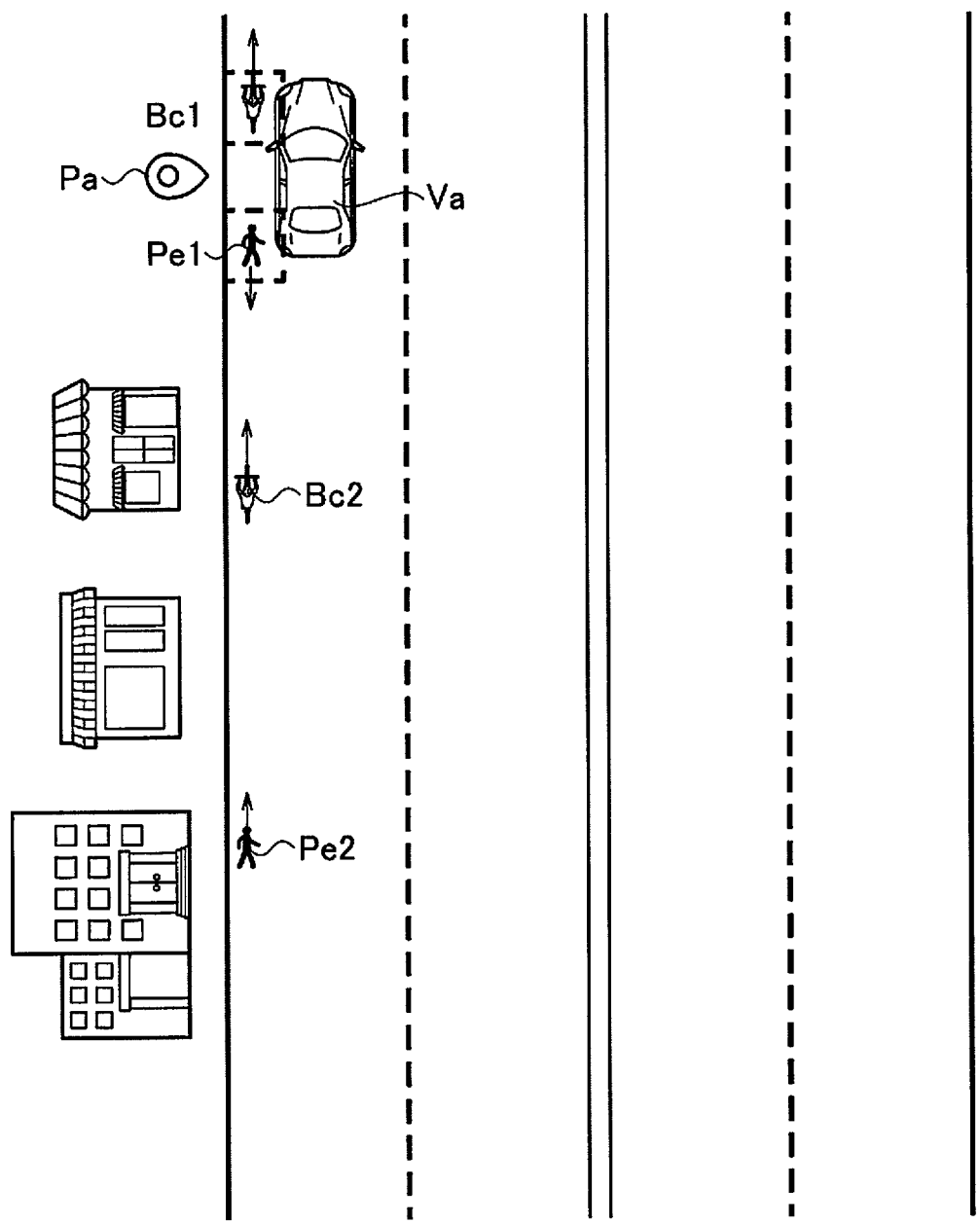
FIG. 8 is an explanatory diagram predicting the behavior of a target object in the case that the vehicle stops at the stop location

Further, as shown in FIG. 7, the detection of objects is performed in all directions with respect to the vehicle Va. Therefore, the object prediction unit 15 also makes a prediction concerning the pedestrian Pe2, who is advancing in a direction approaching the vehicle Va from the front of the vehicle Va. In FIG. 8, the bicycle Be2 and the pedestrian Pe2 are predicted to be in the vicinity of the vehicle Va when the vehicle Va stops at the stop location Pa.

If there are object movement information data generated in the past, the object prediction unit 15 may reference not only the object movement information data generated during the most recent process, but also the object movement information data generated in the past, in order to predict the behavior of the target object.

In Step S17, based on the predicted behavior of the target object, the object prediction unit 15 determines whether there is a possibility that the target object will enter a monitoring region Ra in the case that the vehicle Va comes to a stop at the stop location Pa.

Figure 9:
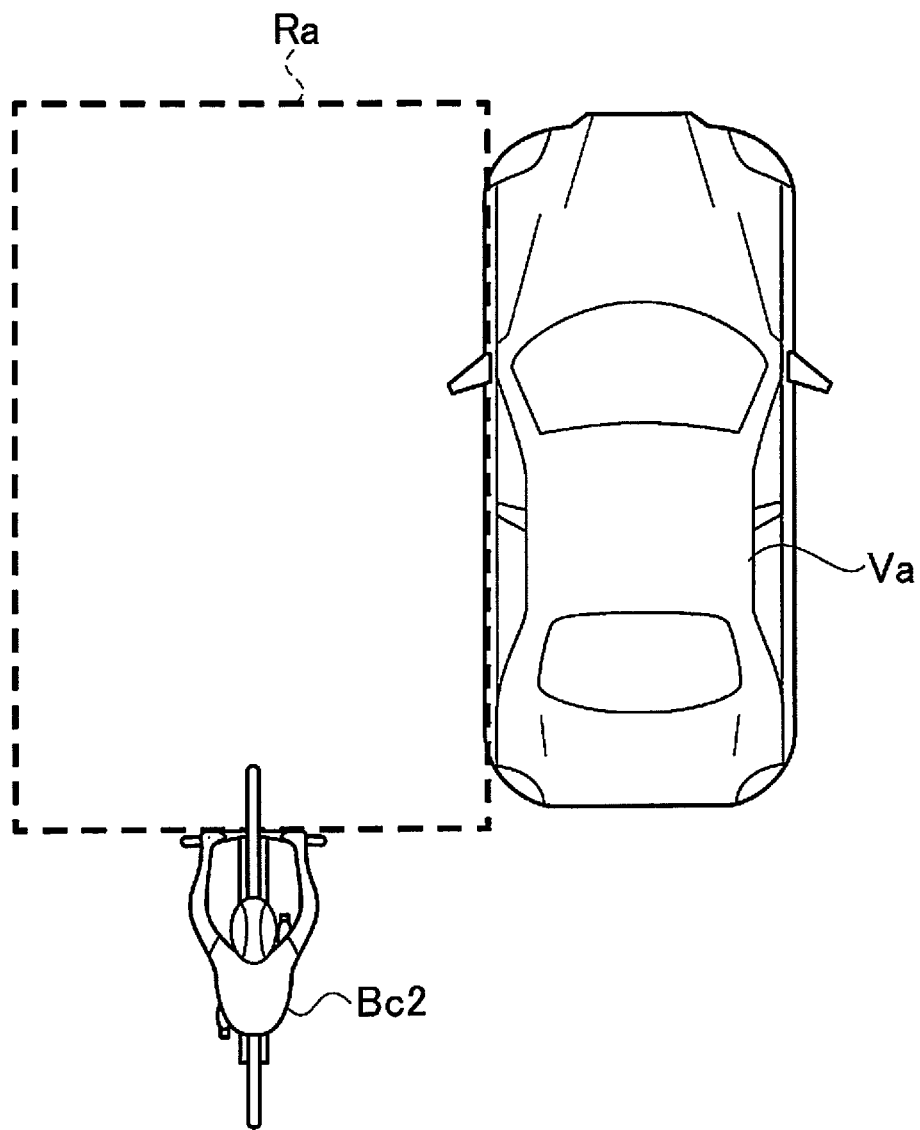
FIG. 9 is a diagram illustrating a monitoring region set around the periphery of a vehicle.

The monitoring region Ra is an area set around the vehicle Va that is used to determine whether to report the presence of a target object to a user deboarding the vehicle Va and. For example, in the case of left-hand traffic, an occupant will normally deboard from the left side of the vehicle Va. As shown in FIG. 9, the monitoring region Ra is set on the left side of the vehicle Va.

If there is a possibility that the target object will enter the monitoring region Ra, Step S17 results in a positive determination, and the process proceeds to Step S18. If, on the other hand, there is no possibility of the target object entering the monitoring region Ra, Step S17 results in a negative determination, and the process proceeds to Step S20.

In Step S18, the object prediction unit 15 generates target object information data. The target object information data are data indicating information related to a target object (object) that may enter the monitoring region Ra. For example, the target object information data are image data capturing a target object that may enter the monitoring region Ra. It is thus possible to recognize the presence of the target object and to recognize the type, etc., of the target object by checking the direct appearance. Further, the target object information data may include information regarding the direction from which the target object enters the monitoring region Ra. Further, in the case that the information providing device 17 is equipped with a speaker that outputs audio, the target object information data may be audio data indicating the target object.

In Step S19, the object prediction unit 15 outputs the target object information data to the information providing device 17 via the communication unit 16.

In Step S20, the object prediction unit 15 determines whether the user's boarding or deboarding has been completed. If the user's boarding or deboarding has been completed, Step S20 results in a positive determination, and the process is ended. If, on the other hand, the user's boarding or deboarding has not been completed, Step S20 results in a negative determination, and the process returns to Step S12.

In this manner, the information providing method according to the present embodiment comprises acquiring stop location data, which indicate the stop location, detecting that the moving vehicle Va will stop at the stop location in the near future, detecting target objects (objects) located in the periphery of the vehicle Va, and acquiring object movement information data based on the detection result of the target object. Further, in the information providing method, it is determined whether there is a possibility that the target object will enter the monitoring region Ra in the case that the vehicle Va comes to a stop at the stop location Pa based on the object movement information data, and when it is determined that there is a possibility that the target object will enter the monitoring region Ra, the object movement information data are transmitted to the information providing device 17.

By means of this method, target objects located in the periphery of the vehicle Va can be detected before the vehicle comes to a stop at the stop location, so that it is possible to detect the target object over a wide area. It is thus possible to increase the accuracy of the information to be provided to the user.

For example, in the case that a peripherally located target object is detected after the vehicle Va arrives at the stop location Pa, blind spots may occur due to other objects, etc., thereby limiting the detection region of the target object. In this case, it may be difficult to detect the object of interest. In this respect, by means of the present embodiment, since it is possible to detect target objects as the vehicle Va travels toward the stop location Pa, objects can be detected over a wide area.

Further, by means of the present embodiment, target objects can be detected around the entire periphery of the vehicle Va. Therefore, in addition to target objects that approach the vehicle Va from behind, target objects approaching from various directions can also be detected. It is thus possible to detect objects over a wide area and to increase the accuracy of the information to be provided to the user.

By means of the present embodiment, if it is determined that there is a possibility that a target object will enter the monitoring region Ra, the target object information data are transmitted to the information providing device 17. However, the vehicle system may perform other controls, such as not unlocking the doors, etc., by themselves or together with the transmission of the target object information data.

The behavior of the target object may be predicted and the target object information data may be transmitted before the vehicle Va arrives at the stop location Pa. In this case, the behavior of the target object may be predicted based only on the movement information obtained at the timing of carrying out the prediction process, or be carried out based on the movement information obtained at the timing of the prediction process and past movement information that has been recorded.

By means of this method, since the target object information data can be recognized before deboarding takes place, the user can perform a foreseen action with respect to the target object when the user deboards. It should be noted that only the behavior prediction of the target object may be carried out before the vehicle Va arrives at the stop location Pa, and the target object information data may be transmitted after the vehicle Va arrives at the stop location Pa.

Further, the behavior prediction of the target object may be carried out after the vehicle Va has arrived at the stop location Pa, and based on the movement information that has been recorded, up to that timing.

That is, "in the case that the vehicle Va stops at the stop location Pa" in the present embodiment may be a case in which the vehicle Va stops at the stop location Pa in the future, or a case in which the vehicle Va has actually stopped at the stop location Pa.

In the information providing method according to the present embodiment, the object movement information data include at least the speed of the target object and the direction of movement of the target object.

By means of this method, it is possible to appropriately determine from the speed of the target object and the direction of movement of the target object whether an object is entering the monitoring region.

Further, in the information providing method according to the present embodiment, the target object information data include the direction from which the target object enters the monitoring region Ra.

By means of this method, the user can understand from which direction the target object is approaching. The user can thereby carry out a specific recognition with respect to the object.

Further, the information providing method according to the present embodiment may identify the type of target object based on the detection result of the target object. In this case, the target object information data may include the type data of the target object.

By means of this method, the user can understand what type of object is approaching. The user can thereby carry out a specific recognition with respect to the object.

Further, in the information providing method according to the present embodiment, the target object information data include image data capturing the target object and/or audio data describing the object.

By means of this method, the user can understand what kind of object is approaching. The user can thereby carry out a specific recognition with respect to the object.

In the information providing method according to the present embodiment, it is determined whether the arrival time until the vehicle Va arrives at the stop location Pa is less than or equal to a preset determination time, and if the arrival time is less than or equal to the determination time, the detection of the target object is started.

By means of this method, by limiting the area over which target objects are detected, objects that may enter the monitoring region Ra can be efficiently detected.

In the embodiment described above, only one user boards the vehicle Va, but a plurality of users may board the vehicle, as in a shared-ride vehicle. If a plurality of users board the vehicle Va, a plurality of information providing devices 17 are associated with the plurality of users. In this case, in the information providing method according to the present embodiment, the target object information data are preferably transmitted to the information providing device 17 out of the plurality of information providing devices 17 that is associated with the user who deboards at the stop location Pa.

By means of this method, necessary information can be selectively provided to the user who deboards the vehicle.

Figure 10:
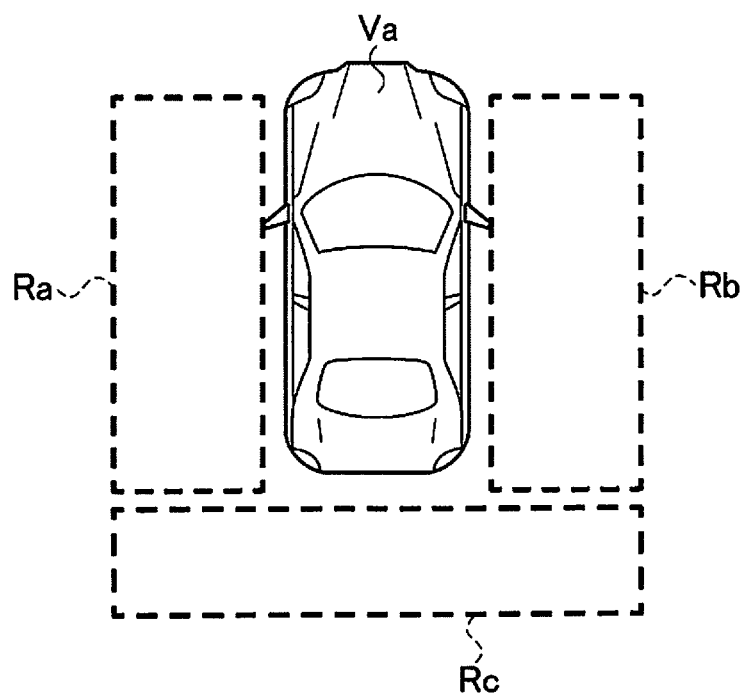
FIG. 10 is a diagram illustrating another aspect of the monitoring region.

Further, in the present embodiment, the monitoring region Ra is set on the left side of the vehicle Va. However, as shown in FIG. 10, the monitoring region is not limited in this way. For example, in the case of right-hand traffic, a monitoring region Rb may be set on the right side of the vehicle Va. Further, a monitoring region Rc may be set behind the vehicle Va. Further, the monitoring region may be a combination of the regions Ra, Rb, Rc.

Further, the monitoring region Ra may be set in accordance with the direction from which the user deboards. For example, if the user is likely to deboard from the left side of the vehicle, the monitoring region Ra is set on the left side of the vehicle Va; if the user is likely to deboard from the right side of the vehicle, the monitoring region Rb is set on the right side of the vehicle Va, etc. In this case, the user may be the driver.

Figure 11:
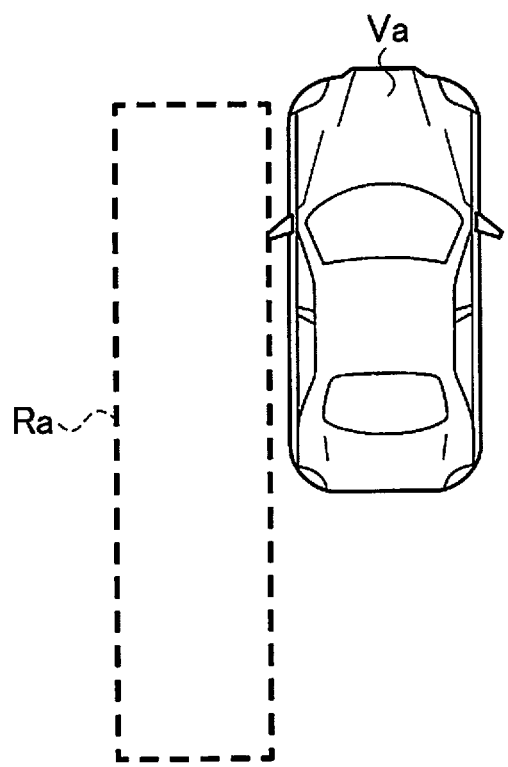
FIG. 11 is a diagram illustrating an example of the monitoring region corresponding to the type of the target object.

Further, the monitoring region Ra may be switched depending on the type of target object. For example, two-wheeled vehicles are faster than pedestrians, so that care must be taken during deboarding. Thus, as shown in FIG. 11, if the target object is a two-wheeled vehicle, the monitoring region Ra may be increased.

Further, the vehicle system 10 according to the present embodiment has technical matters corresponding to the information providing method described above, and achieves the same actions and effects as the vehicle control method.

Further, in the present embodiment, the processing unit 14 acquires (computes) the movement information based on the detection result of the object by the object detection device 11 and directly acquires the movement information from the object detection device 11. The processing unit 14 functions as part of the information collection device that acquires movement information. However, the information collection device of the vehicle system 10 may use V2X (Vehicle to Everything) technology, including vehicle-to-vehicle communication, to acquire movement information from an object other than the host vehicle.

In the present embodiment, although the vehicle system 10 carries out the prediction process, an external device (e.g., the management device 20) that can communicate with the vehicle Va may perform the prediction process. This realizes the same actions and effects as the vehicle control method. That is, the management device 20 obtains from the vehicle object information data, which is information related to an object collected using sensors as the vehicle is motion, and computes the object movement information data, which is information related to the movement of the object, based on the object information data. The management device 20 then determines, based on the object movement information data, whether it is possible that the object will enter the monitoring region in the case that the vehicle stops at the stop location, and if it is determined that it is possible that the object will enter the monitoring region, transmits information data related to the object to be provided to the user. The data may be transmitted first to the vehicle system 10, and then by the vehicle system 10 to the information providing device 17, or directly transmitted to the information providing device 17.

An embodiment of the present invention has been described above, but the descriptions and figures that form part of this disclosure should not be understood as limiting the present invention. From this disclosure, various alternative embodiments, examples, and operating techniques should be apparent to those skilled in the art.

The invention claimed is:

1. An information providing method for an information processing device that outputs information to a display device that selectively provides information to a user who is scheduled to deboard a vehicle, the information providing method comprising:
   acquiring stop location data indicating a stop location at which the vehicle stops;
   detecting the vehicle that is traveling is about to stop at the stop location;
   detecting an object located in a periphery of the vehicle while the vehicle is traveling towards the stop location;
   acquiring movement information data, which is information related to movement of the object that was detected;
   determining, before the vehicle stops at the stop location, a possibility that the object will enter a monitoring region set around the periphery of the vehicle based on the movement information data in a case where it is determined that the vehicle will stop at the stop location; and
   selectively transmitting information data related to the object to the display device for the user who is scheduled to deboard the vehicle at the stop location upon determining the possibility that the object will enter the monitoring region,
   the movement information data including a speed and a direction of movement of the object.

2. The information providing method according to claim 1, wherein
   the display device is a mobile information terminal owned by the user who is scheduled to deboard the vehicle at the stop location.

3. The information providing method according to claim 1, wherein
   in addition to the detecting the vehicle that is traveling is about to stop at the stop location, detecting a presence or absence of the user who is scheduled to deboard the vehicle at the stop location.

4. The information providing method according to claim 1, wherein
the information data related to the object include a direction from which the object enters the monitoring region.

5. The information providing method according to claim 1, further comprising
identifying a type of object based on a detection result of the object, and
the information data related to the object include type of object data.

6. The information providing method according to claim 1, wherein
the information data related to the object include image data capturing at least one of the object and voice data describing the object.

7. The information providing method according to claim 1, wherein
when a plurality of users board the vehicle and a plurality of display devices are associated with the plurality of users,
the information data related to the object is transmitted to the display device, out of the plurality of display devices, that is associated with the user who is scheduled to deboard at the stop location.

8. The information providing method according to claim 1, further comprising
determining whether an arrival time until the vehicle arrives at the stop location is less than or equal to a preset determination time, and
start detection of a target object if the arrival time is less than or equal to the determination time.

9. The information providing method according to claim 1, wherein
the information data related to the object is transmitted to the display device before the vehicle stops at the stop location.

10. A vehicle system comprising:
a display device configured to selectively provide information to a user who is scheduled to deboard a vehicle;
an information collection device configured to collect information data related to an object located in a periphery of the vehicle;
a communication device configured to communicate with the information collection device and the display device; and
a controller configured to control the communication device, wherein
the controller is configured to
acquire stop location data indicating a stop location at which the vehicle stops,
detect the vehicle that is traveling is about to stop at the stop location,
detect an object located in a periphery of the vehicle while the vehicle is traveling towards the stop location using data acquired from the information collection device,
acquire movement information data, which is information related to movement of the object that was detected using the information collection device,
determine, before the vehicle stops at the stop location, a possibility that the object will enter a monitoring region set around the periphery of the vehicle based on the movement information data in a case where it is determined that the vehicle will stop at the stop location, and
selectively transmit information data related to the object to the display device to the user who is scheduled to deboard the vehicle at the stop location upon determining the possibility that the object will enter the monitoring region,
the movement information data including a speed and a direction of movement of the object.

11. A management device comprising:
an information collection device configured to collect information data related to an object located in a periphery of a vehicle;
a communication device configured to communicate with a display device that selectively provides information to a user who is scheduled to deboard the vehicle; and
a controller configured to control the communication device, wherein
the controller is configured to
acquire stop location data indicating a stop location at which the vehicle will stop,
detect that the vehicle that is traveling is about to stop at the stop location,
detect an object located in a periphery of the vehicle while the vehicle is traveling towards the stop location using data acquired from the information collection device,
acquire movement information data, which is information related to a movement of the object detected by the information collection device,
determine, before the vehicle stops at the stop location, a possibility that the object will enter a monitoring region set around the periphery of the vehicle based on the movement information data in a case where it is determined that the vehicle will stop at the stop location, and
selectively transmit information data related to the object to the display device for the user who is scheduled to deboard the vehicle at the stop location upon determining the object will possibly enter the monitoring region,
the movement information data including a speed and a direction of movement of the object.

12. The information providing method according to claim 1, wherein
the movement information data includes historical information related to the movement of the object as the vehicle is traveling.

13. The information providing method according to claim 1, wherein
the movement information data includes historical information related to the speed and the direction of movement of the object as the vehicle is traveling.

14. The information providing method according to claim 1, wherein
the detecting the object located in the periphery of the vehicle while the vehicle is traveling towards the stop location, the acquiring movement information data, the determining the possibility that the object will enter the monitoring region, and the selectively transmitting the information data related to the object to the display device for the user who is scheduled to deboard the vehicle at the stop location are repeated until it is determined that the user scheduled to deboard the vehicle has deboarded the vehicle.

* * * * *